Jan. 29, 1929.  
L. C. COLE  
1,700,309  
DRUM TYPE MILLING MACHINE  
Filed March 11, 1926 3 Sheets-Sheet 1

INVENTOR  
L.C.Cole  
BY  
Joseph N. Schofield  
ATTORNEY

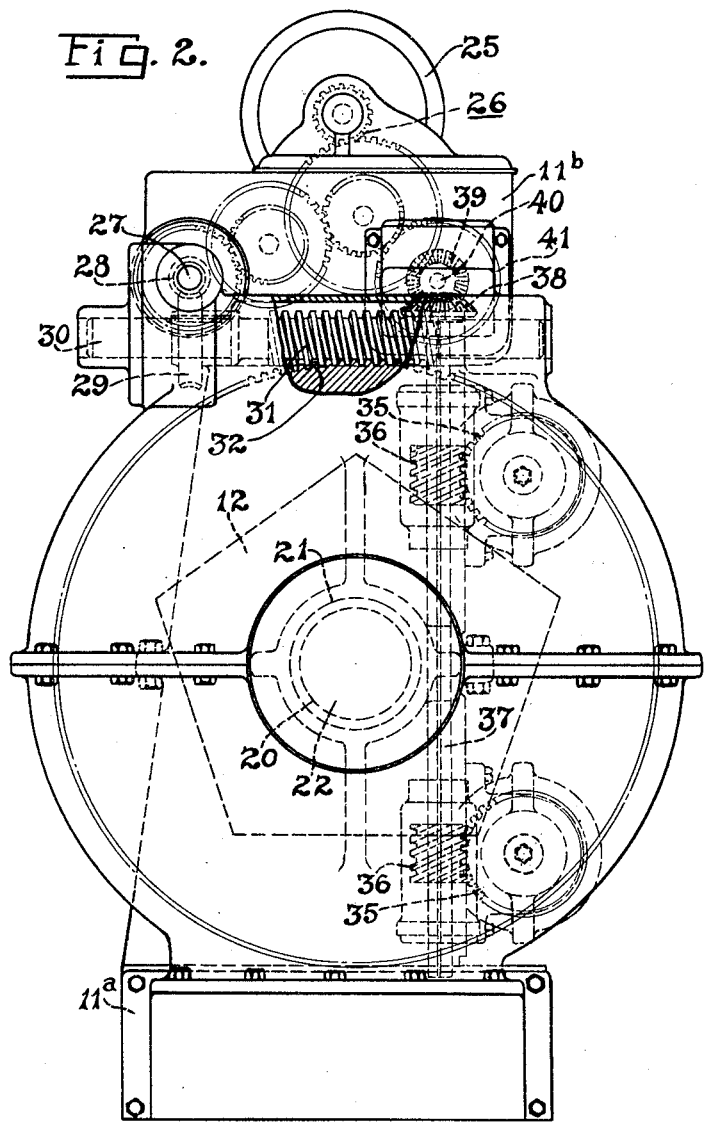

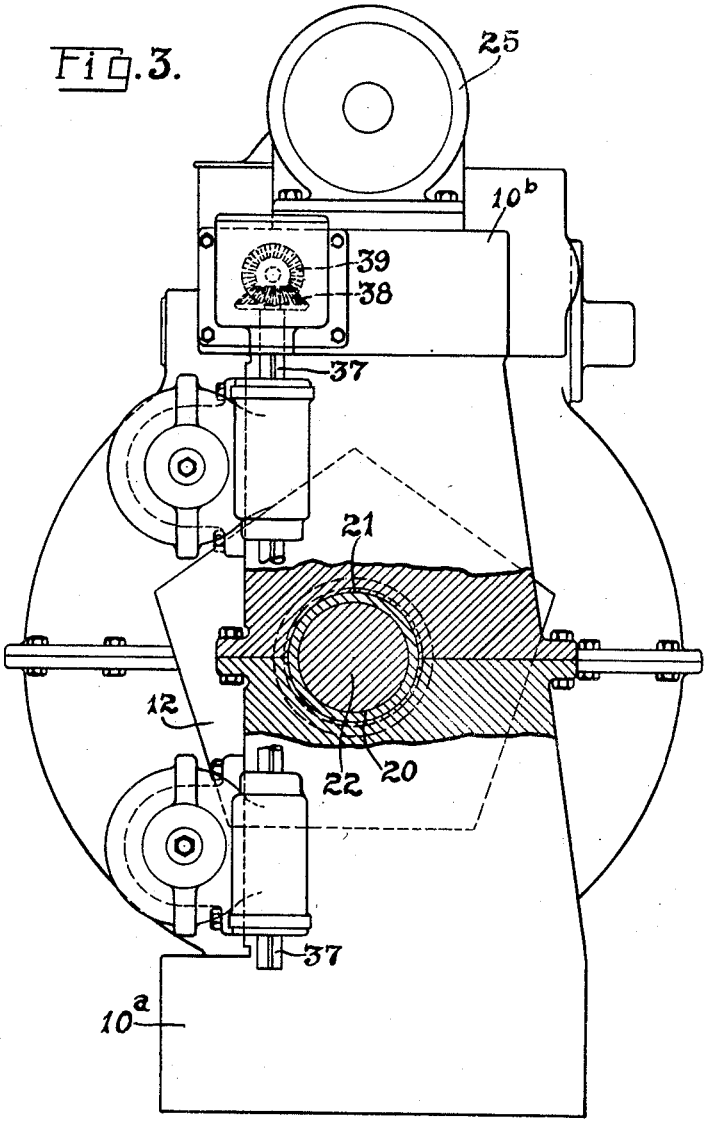

Patented Jan. 29, 1929.

1,700,309

UNITED STATES PATENT OFFICE.

LYNDON C. COLE, OF HAMILTON, OHIO, ASSIGNOR TO NILES-BEMENT-POND COMPANY, OF NEW YORK, N. Y., A CORPORATION OF NEW JERSEY.

DRUM-TYPE MILLING MACHINE.

Application filed March 11, 1926. Serial No. 94,004.

This invention relates to milling machines of the continuous operating type in which the work pieces are mounted upon a slowly rotatable drum.

An object of the invention is to provide an improved form of frame for rigidly mounting the work supporting and rotating drum and the cutter spindles.

One feature which enables me to accomplish the above named object is that I provide the bearings for the spindle on which the work drum is mounted and also mount the cutter heads upon side housings which extend the entire height of the machine. That is, they extend from the foundation or floor line of the machine to the upper surface on which the power means for operating the drum and spindles are mounted.

Another object of the invention is to provide housings of a new form having separate upper and lower sections, the intermediate ends of which are rigidly bolted together and each provided with recesses forming the bearings within which the drum supporting spindle is mounted.

A further object of the invention is to provide a milling machine of the above indicated type adapted to be built in varying widths with a minimum of alterations. For this purpose the side housings are attached rigidly together by spacing members intermediate the upper and lower ends of the housings. These spacing members engage the side housings upon inside vertical surfaces and are also provided with tongues engaging corresponding grooves in the side housings. To adapt the machine for varying types of work and for different widths of drum it is only necessary, therefore, to provide spacing members of different lengths, the length of the driving shafts for the drum and cutter spindles being accordingly lengthened or shortened.

With these and other objects in view, my invention consists in the features of construction and operation set forth in the following specification and illustrated in the accompanying drawings.

In the accompanying drawings annexed hereto and forming a part of this specification, I have shown my invention embodied in a drum type continuous milling machine adapted for work of large size, but it will be understood that the invention can be otherwise embodied and that the drawings are not to be construed as defining or limiting the scope of the invention, the claims appended to this specification being relied upon for that purpose.

In the drawings:

Fig. 2 is a side elevation taken from the left-hand side as seen in Fig. 1, and

Fig. 3 is a view similar to Fig. 2 taken from the opposite side of the machine.

Figure 1:
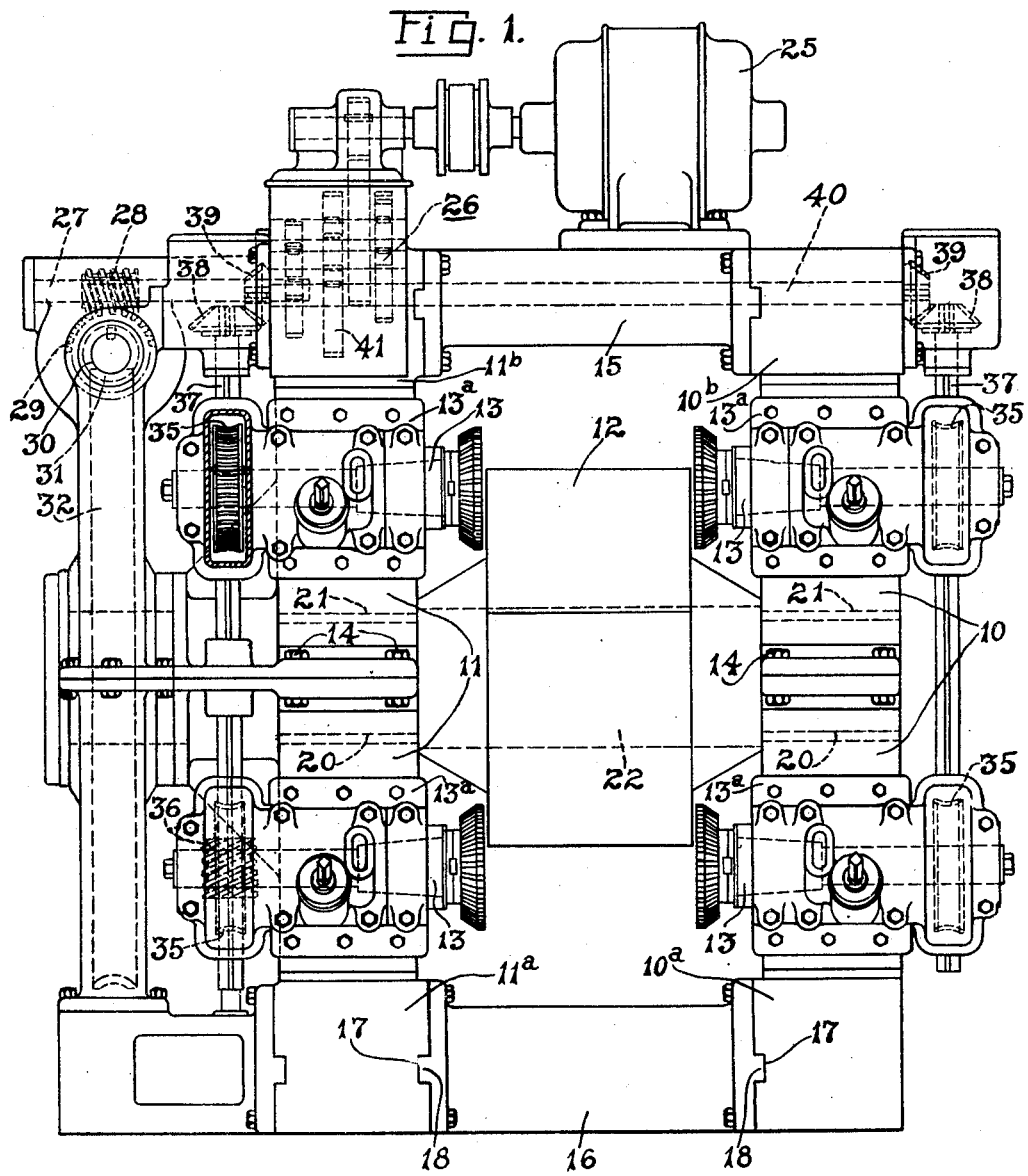
Figure 1 is a front elevation of the complete machine.

In the above mentioned drawings I have shown but one embodiment of the invention which is now deemed preferable, but it is to be understood that changes and modifications may be made within the scope of the appended claims without departing from the spirit of the invention.

Briefly and in its broadest aspect, my invention comprises the following principal parts: first, opposed side housings formed of lower and upper sections rigidly secured together; second, bearings for a work supporting and rotating spindle formed in the intermediate or contiguous ends of these housing sections; third, upper and lower spacing members attached to inside vertical walls of the side housings adjacent the upper and lower ends thereof; fourth, a drum mounted on the work supporting spindle; fifth, cutter spindles mounted on the forward vertical walls of the side housing; and sixth, driving means for the drum and cutter spindles mounted on the upper spacing member.

Referring more in detail to the figures of the drawings, my invention comprises a milling machine adapted for continuous operation on large and heavy work pieces. This machine is formed of opposed side housings 10 and 11 fixedly connected together to form a rigid frame for supporting a work rotating drum 12 intermediate the side housings 10 and 11. The side housings 10 and 11 also carry the cutter spindles 13 for operation upon the work pieces secured to the drum 12. For this purpose the side housings 10 and 11 are each made of two sections 10$^a$ and 10$^b$ and 11$^a$ and 11$^b$ forming upper and lower sections rigidly bolted or otherwise secured together at their intermediate ends as by bolts 14. Adjacent the extreme upper and lower ends of these side housings 10 and 11 are spacing members 15 and 16 bolted directly to the inside vertical surfaces of the side housings. Preferably the side housings 10 and 11 are provided with horizontal grooves 17 into which tongues 18 formed on the opposite ends of the spacing members 15 and 16 may enter.

It will be seen from the above that the lower sections of the side housings 10 and 11 extend to the floor line or foundation for the machine and that the lower ends of the side housings are very rigidly secured together by one of the spacing members 16. The upper ends of the upper sections 10$^b$ and 11$^b$ of the side housings are similarly attached together by the other spacing member 15 also provided with tongues 18 on opposite ends to engage grooves 17 corresponding to those formed in the lower section. This upper spacing member 15 is also attached to the inside vertical walls of the side housings 10 and 11 adjacent the extreme upper end thereof.

The contiguous or intermediate ends of the upper and lower sections of the side housings are adapted to be secured together by means of the bolts 14 spaced as shown in Figs. 1 and 3. In these ends of the side housings are recesses 20 and 21 forming half bearings for the ends of the spindle 22 carrying the work rotating drum 12. Preferably, and as shown in the drawings, the bearings in the opposite side housings 10 and 11 are formed equally within the lower and the upper sections of the side housings so that by removing the upper sections 10$^b$ and 11$^b$, the spacing member 15 and attached parts, the drum 12 and its spindle 22 may be readily removed.

To rotate the work rotating drum 12 and the cutter spindles 13 a motor 25 is mounted on the upper spacing member 15. Driving connections 26 from the motor 25 are provided preferably within the upper end of one of the side housings 11. By means of these driving connections a shaft 27 is rotated on which is mounted a worm 28 which engages and rotates a worm wheel 29. This worm wheel 29 is on a short shaft 30 also carrying a worm 31 which engages a large worm wheel 32 on the end of the work rotating spindle 22. By means of these connections the work spindle 22 and its drum 12 are very slowly rotated.

The cutter spindles 13, rotatably mounted within their heads 13$^a$, are provided with worm wheels 35 on their outer ends. These worm wheels 35 are engaged by worms 36 splined or otherwise mounted on vertical driving shafts 37. The upper ends of these shafts 37 are provided with bevel gears 38 in mesh with corresponding bevel gears 39 on a transverse driving shaft 40 suitably mounted within the upper ends of the side housings 10 and 11 and the upper spacing member 15. On this transverse shaft 40 is a gear 41 adapted to be drivingly connected to a gear on one of the shafts of the driving connections 26. By these means the cutter spindles 13 are simultaneously rotated at similar speeds.

What I claim is:

1. A milling machine comprising in combination, a pair of opposed side housings adapted to rest directly upon suitable foundations, a work rotating drum supported thereon between said housings, cutter spindles rotatably mounted on said housings, spacing members attached to said housings upon inside vertical surfaces of said housings adjacent the upper and lower ends thereof, and tongue and groove connections between said spacing members and side housings.

2. A milling machine comprising in combination, a pair of opposed side housings extending from the floor line to the full height of the machine and adapted to rest directly upon suitable foundations, said housings comprising separate lower and upper sections, a work rotating drum supported thereon between said housings, bearings therefor formed between said lower and upper sections, cutter spindles rotatably mounted on said housings, and spacing members rigidly connecting said housings together intermediate their ends, said spacing members being attached to said housings upon inside vertical surfaces of said housings.

In testimony whereof, I hereto affix my signature.

LYNDON C. COLE.